Feb. 11, 1936.                R. K. POTTER                 2,030,180
                ELECTRICAL CIRCUIT ARRANGEMENT
            Original Filed Jan. 19, 1933      2 Sheets-Sheet 1
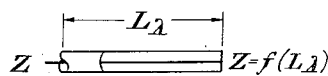
Fig. 1a
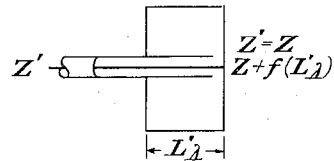
Fig. 1b
Fig. 1c
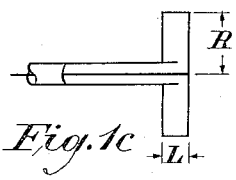
Fig. 2'   Fig. 2   Fig. 2"
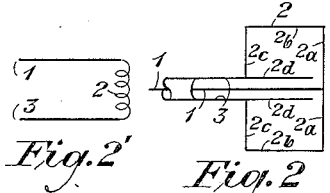
Fig. 3'   Fig. 3
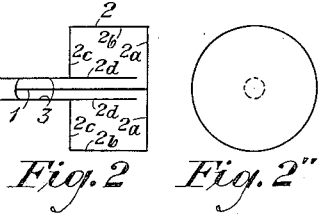
Fig. 4'   Fig. 4
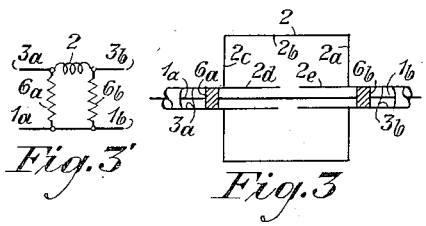
Fig. 5'   Fig. 5
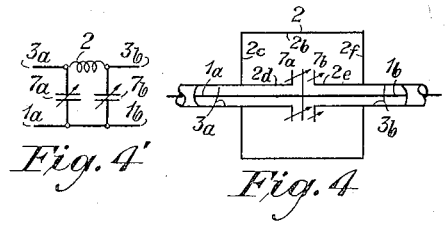
Fig. 6'   Fig. 6
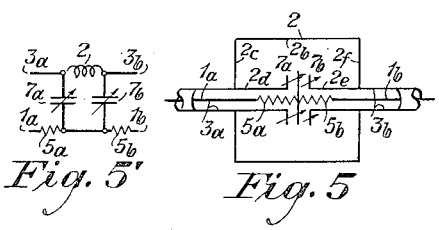
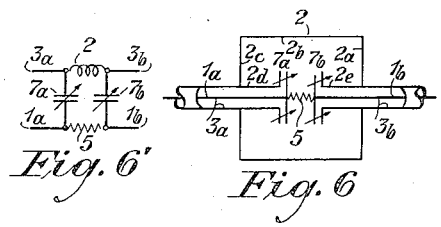
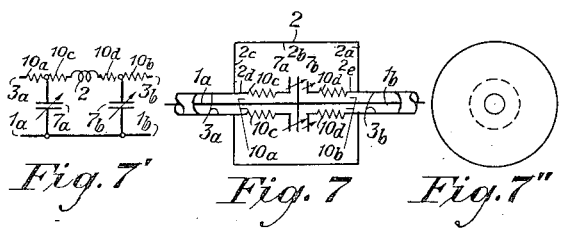
Fig. 7'   Fig. 7   Fig. 7"
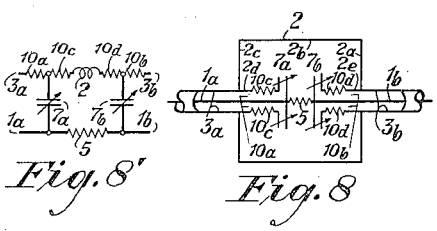
Fig. 8'   Fig. 8
INVENTOR
R. K. Potter
BY
ATTORNEY Feb. 11, 1936.                    R. K. POTTER                    2,030,180
                        ELECTRICAL CIRCUIT ARRANGEMENT
              Original Filed Jan. 19, 1933        2 Sheets-Sheet 2
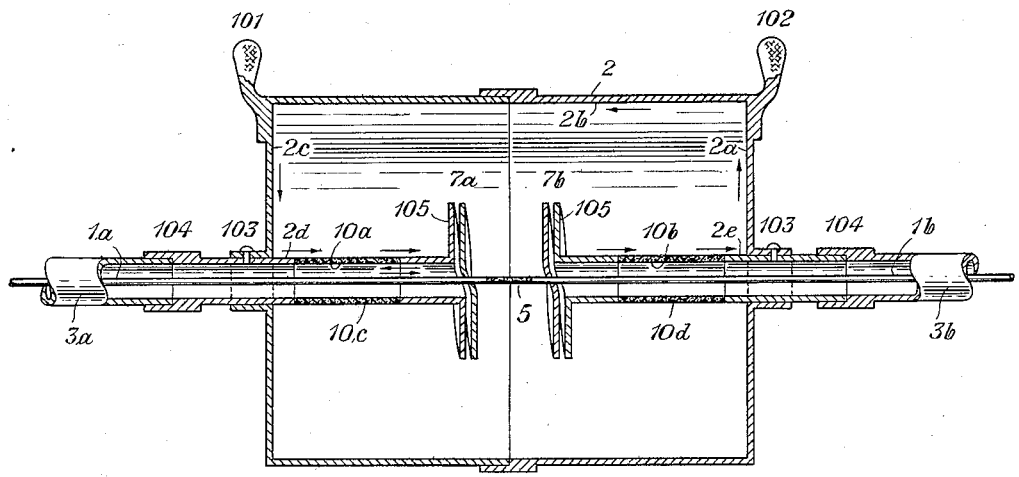
Fig. 8"
INVENTOR
*R. K. Potter*
BY
ATTORNEY

Patented Feb. 11, 1936

2,030,180

UNITED STATES PATENT OFFICE 2,030,180

ELECTRICAL CIRCUIT ARRANGEMENT

Ralph Kimball Potter, Madison, N. J., assignor to American Telephone and Telegraph Company, a corporation of New York Original application January 19, 1933, Serial No. 652,556. Divided and this application August 18, 1933, Serial No. 685,791

7 Claims. (Cl. 178—44)

This application is a division of my application, Serial No. 652,556, filed January 19, 1933, and is in effect a division of my application, Serial No. 685,790 filed of even date herewith.

This invention relates to an electrical inductive element, adaptable to concentric conductor transmission lines, the physical dimensions of which are not necessarily related to the wave length of oscillation and in which the currents and potentials are distributed symmetrically about an axis.

In the following description there is disclosed in detail the functioning of this inductive device and arrangements of this inductive device in combination with capacitative and resistive elements to form translation circuits such as pi networks.

In the drawings, Fig. 1a illustrates a simple conductor circuit; Figs. 1b, 1c, and 2 illustrate forms of the inductive device of the present invention; Figs. 3 to 8, inclusive, show the invention as applied to a translation circuit of the pi network type; Fig. 8″ corresponds to Fig. 8 but with more indication of structure; Figs. 2′ to 8′, inclusive, are simplified circuit diagrams which are equivalent to the arrangement shown in Figs. 2 to 8, inclusive; and Fig. 7″ is an end view showing the cross-sectional shape of the enclosing vessel of Fig. 7, this end view being in general applicable to Figs. 1b to 8, inclusive.

An important feature of the inductive element disclosed in this application is that its longitudinal dimensions are not directly related to the wave length of oscillation. Fig. 1a illustrates a section of concentric conductors short-circuited at the far end and of a length Lλ. It is readily apparent that the input impedance Z of this section is a function of the length as the constants of the circuit are distributed smoothly along the circuit. In Fig. 1b is shown the inductive element of this invention, the functioning of which will be described later in more detail. In this structure the constants of the concentric conductor circuit may be obtained in greater magnitude; thus the physical dimensions of the enclosing vessel, which is large in comparison with the concentric conductors, may be so chosen as to result in the input impedance Z′ being equal to Z, but Z′ is not necessarily a function of the physical length of the element (L′λ).

The proportionality of the various dimensions of the inductive element is variable. Fig. 1c illustrates an inductance element in which the radius of the enclosing vessel (assuming a hollow circular cylinder) is large in comparison with its length.

The manner in which the enclosing vessel functions as an inductance will now be described in detail. The inductive device is illustrated in Fig. 2. To the left of Fig. 2 is shown the equivalent electrical circuit. This device consists of two concentric conductors 1 and 3 projecting into a closed cylindrical vessel 2 of conducting material which forms the reactive element. This cylindrical vessel or "tank", as it will henceforth be called, is coaxial to the concentric system, the central conductor of which makes contact with the center of the opposite face 2a of the enclosure, while the external conductor which projects some distance into the tank is connected to the near or left-hand face 2c. The size of this tank and the relative distance that this outer conductor, section 2d, projects into the tank are the determining factors of the amount of inductance obtainable from the tank circuit.

The path that the radio-frequency current takes in this circuit is as follows: Let it be assumed that the wave coming down the concentric conductor is such that the instant under discussion that current flows to the right on the inner conductor 1 and to the left on the inner surface of the outer conductor 3. When the current on 1 reaches the end of this conductor, it will flow outward along the face of the cylindrical enclosure 2a, then to the left on the inner side of the walls of the tank 2b, inward on the inner side of the left-hand face 2c, to the projecting section of conductor 3, which is labeled 2d, to the right along the outer surface of 2d to its end and thence to the inner surface of 3 and to the left. The directions of current flow at various points of the apparatus are indicated by arrows in Fig. 8″ which will be mentioned later.

The current which followed the path described above, around the interior surfaces of the cylindrical vessel, will be seen to have flowed as a current sheet which formed the surface of something resembling a toroid. The magnetic field associated with this current would consist of circular lines of force lying within the vessel, concentric to the concentric tube conductor and coaxial with it. It is evident that the inductive effects of this current with its associated magnetic field represent the inductive element of the equivalent circuit.

It is also evident that there will be certain distributed capacity effects in this structure, for example, the capacity between the internal surface of the terminating vessel and the external surface of the concentric tube structure projecting into it. These stray capacities will, in general, be of the same character as the distributed capacity in an ordinary inductance coil and will be minimized to the extent that the physical dimensions of the system are small in comparison with the wave length of the currents involved. Therefore, the exactness with which true capacities and true inductances can be simulated will be subject to the same difficulties as are involved with ordinary coils and condensers, although they may be of a different order of magnitude.

While several ways of viewing the transfer of energy through the device of this invention are permissible, if one looks at the phenomenon in terms of a flow of current, then the action of the device may be understood more clearly by pointing out that the tank cylinder 2 and conductor 1 act effectively as a one-turn toroid of rectangular cross-section in which, as previously stated, the current may be considered as entering on conductor 1, spreading out radially over the remote disc end, passing longitudinally along the inner surface of 2, coming in radially on the inner surface of the other disc end, flowing on the outer surface of the portion 2d towards the right, and then flowing to the left on the inner surface of 2d and continuing on the inner surface of 3. This sets up a magnetic field entirely enclosed in the tank and introduces an inductance the value of which can be obtained approximately from a well known formula for the inductance of a toroid of rectangular cross-section. Among other places, this formula is given in Bureau of Standards Circular No. 74, page 251, as:

$$L = .004606 n^2 h \log_{10} \frac{r_2}{r_1}$$

in which L is expressed in microhenries, n is the number of turns (in this case, one), h is the inside length of the tank, $r_1$ is the radius of the inside conductor and $r_2$ is the inside radius of cylinder 2.

As an illustration, we may take $h=100$ centimeters, $r_1=.25$ centimeters and $r_2=50$ centimeters, whereupon calculation readily shows that $L=1.06$ microhenries. It will be evident from the formula that a wide variety in the length and radial dimensions of the tank circuit will provide the same value of inductance L.

The extent to which conductor 3 extends into the tank has an effect on the constants of the circuit, but precise formulae therefor are not available. In general, however, if one considers the transmission line as including the portion 2d and terminating at the end thereof, then the inductance of the tank circuit is approximately proportional to the area of the longitudinal cross-section of the tank reduced by the area of the longitudinal cross-section of the portion of the transmission line extending into the tank. Thus it is seen that lengthening the portion of the conductor 2d decreases the inductance of the device to a small extent. Another consideration in this connection, however, is the degree of coupling between the conductor 1 and the tank circuit. This coupling comes about chiefly through the uncovered portion of conductor 1 within the tank and is greater as the uncovered portion increases, that is, as the length 2d decreases.

It should be emphasized again that the use of the tank circuit is not dependent upon the frequency to be impressed upon the line and that, in fact, the value of the inductance, as calculated, will be substantially independent of frequency so long as the wave length corresponding thereto is large compared to the dimensions of the parts of the device. In certain cases, however, as in Figure 3b, some of the dimensions may approach those of the wave length or be simply related thereto, in which event certain special results are obtained.

Arrangements embodying the elements and principles of the invention as above described to obtain pi networks, are illustrated in Figs. 3 to 8, inclusive. In Fig. 3, an arrangement consisting of an inductance in one side of the line with two resistances shunting the line, one each side of the resistance, is illustrated. This arrangement differs from that of Fig. 2 particularly in that the concentric conductor enters the enclosing vessel or tank 2 at each end wall thereof, the inner conductor, however, extending entirely through the tank. In Fig. 3 also, resistances 6a and 6b are added which may be in the form of hollow cylinders enclosing the inner conductors 1a and 1b and extending to the outer conductor 3a or 3b as the case may be.

This arrangement functions as follows:

If the current is flowing toward the right on conductor 1a, part of the current passes through the resistance 6a to the conductor 3a. Part of the current also flows over the inner conductor to the resistance 6b where it again divides, part of the current flowing through the resistance 6b to the outer conductor 3b and part of the current passing over the inner conductor to some distant point and thence returning on the inner surface of the outer conductor 3b, where it joins with the current through the resistance 6b to flow to the inner end of the inner surface of the outer conductor 3b, and thence over the outer surface 2e, then over the inner surfaces 2a, 2b, and 2c of the enclosing vessel or tank 2, thence over the outer surface 2d of the outer conductor 3a, and finally over the inner surface of the outer conductor 3a to join the current through the resistance 6a, which then flows on to the left on the inner surface of the outer conductor 3a.

In Fig. 4 the shunt resistances of Fig. 3 have been replaced by shunt condensers. The condensers are formed by attaching flanges to the ends of the two sections of the outer conductors which project into the tank from opposite directions and by attaching a disc to the inner conductor of the concentric conductor system, between these two flanges. Thus each side of the disc forms a plate for one of the condensers.

The operation of the arrangement in Fig. 4 is as follows: Current flowing to the right over conductor 1a divides at the disk associated with the inner conductor, part of the current flowing as a displacement current through the plates of the condenser 7a and thence over the inner surface of the outer conductor 3a to the left. Part of the current flows as a displacement current through the condenser 7b and over the outer surface 2e of the outer conductor 3b to the inner wall 2f of the tank 2. Part of the current also continues over the inner conductor 1b to some distant point and returns over the inner surface of the outer conductor 3b to the end of said outer conductor near the center of the enclosing tank from which point it passes over the outer surface 2e of the outer conductor along with the displacement current previously described. From this point the displacement current and the returning current flow over the inner surfaces 2f, 2b, and 2c of the tank 2, over the outer surface 2d of the outer conductor 3a and then over the inner surface of the outer conductor 3a to the left.

Fig. 5 illustrates the manner in which resistance may be inserted in one side of the system. Resistances 5a and 5b are inserted in series with conductors 1a and 1b both sides of the central disc, the sides of which form the corresponding plates of the shunt condenser. Resistance could also be placed in the other side of the circuit by placing hollow cylindrical resistances in sections 3a and 3b of the outer conductor.

Fig. 6 illustrates the manner in which a series resistances may be placed in one side of the circuit between the two shunt condensers. In this arrangement it was necessary to spread the condensers and insert resistance 5. Thus two discs attached to the central conductor are required rather than one as in Figs. 4 and 5. Assume that the current in the system at a particular instant is traveling to the right on the inner conductor 1a. This current reaches the first disc which is part of condenser 7a and divides, part flowing through condenser 7a as displacement current and back to the left on the inner side of conductor 3a, the remainder flowing around the disc and across resistance 5 to condenser 7b. Here again the current divides, part of it flowing as displacement current through condenser 7b, and through the inductance 2 by way of 2e, 2a, 2b, 2c, and 2d, to the inner surface of the flange of condenser 7a where it joins the displacement current that is flowing through condenser 7a. The remaining portion flows along 1b to the terminating circuits and returns along 3b to the flange of condenser 7b. Here it joins the displacement current that is flowing through 7b and takes the path described above for that current.

Fig. 7 illustrates an arrangement including resistance in series with the inductance of the pi network. These resistances are in two sections, one each side of the point at which a shunt condenser is attached to that side. The inner and outer surfaces of the hollow cylindrical resistances which are placed in the two sections of the outer conductors which project into the tank constitute the two independent sections of the resistance which is placed each side of the inductances and between whose two sections the shunt condenser is connected.

Referring to Fig. 7 and assuming that the direction of current flow at a particular instant is to the right on the inner conductor and to the left on the inner surface of the outer conductor, the various paths of the current of the system are as follows. Current flowing to the right on 1a reaches the common disc of condensers 7a and 7b. Part of this current flows as displacement current from the left-hand face of the central disc to the flange of 7a, thence to the left along the inner surface of the hollow cylindrical resistance in the left-hand section of the outer conductor and along the inner surface of this outer conductor 3a. The inner surface of this resistance is designated 10a. The remainder of the current flows around the disc to the right-hand face and some of it passes as displacement current through condenser 7b while the remainder travels along 1b. The portion that passes through 7b will flow around the flange and to the right across the outer surface of the hollow cylindrical resistance situated in the right-hand section of the outer conductor which projects into the tank. This outer surface is designated 10d. This portion of the current then passes through the inductance 2 by way of 2e, 2a, 2b, 2c, and 2d, to the right across the outer surface of the hollow cylindrical resistance in the left-hand section of the outer conductor, designated 10c, part of this current penetrating to the inner surface 10a and part of it flowing around the flange of 7a where it joins the displacement current that is flowing through 7a, and thence along 10a and 3a. The portion of the current which continues along 1b goes to the terminating circuits and returns to the left along the inner surface of the outer conductor 3b. Part of this current penetrates through the resistance which is situated in the right-hand section of the outer conductor to the outer surface 10d while the remainder flows across the inner surface, designated 10b, to the flange of condenser 7b where it joins the displacement current which is flowing through condenser 7b.

Fig. 8 illustrates the manner in which a resistance may be inserted in one side of the circuit opposite the inductance branch and between the shunting condensers. In this arrangement, as in the one illustrated in Fig. 6, the two condensers 7a and 7b are spread apart and a resistance 5 inserted in the central conductor between the two condensers. The adjustment for capacity in the two condensers indicated at 7a and 7b may be attained by means of the construction shown in Fig. 8''. Each condenser has its plates of helicoidal form with moderate pitch. The cylindrical shell 2 is constructed of two parts fitting together like a pill box, each being independently rotatable by means of its respective handle 101 or 102. Each part of the shell 2 is rigidly connected to a corresponding portion of the outer shell 3a of the concentric conductor at the place where they meet, that is at 103, but each such portion of this outer shell 3a has a relatively rotatable joint on one side, as shown at 104. Thus when either half of the enclosing vessel 2 is rotated, it carries with it that part of the outer shell of the concentric conductor which it surrounds and one plate 105 of condenser 7a or 7b. By virtue of the helicoidal form of the plates, the spacing between the two plates of the condenser 7a or 7b will be varied and the condenser capacity will be adjusted accordingly.

The arrows shown in Fig. 8'' indicate approximately the directions of current flow at different parts at a given instant, for that part of the current which flows around the inside face of the outer wall of the vessel 2. It will be understood that at these high frequencies the currents and electromotive forces are in different phase at different places along the entire concentric conductor system. It is not to be understood that the arrows in Fig. 8'' indicate precise phase agreement at all the places where they appear.

Although in the above discussion the inductive element was described as a closed hollow cylindrical vessel, it is not intended that this application be limited to this particular system. Any physical system which is symmetrical about an axis could be employed; for example, the enclosing vessel might actually be a toroidal shape rather than a section of a cylinder. The inductance of this tank circuit may be made variable by several methods. The distance that the outer conductor projects into the tank may be made variable by having the tank slip along the outer conductor or by dividing this section of the conductor into two parts, one of which slides into the other. The length of the tank may also be made variable by dividing it into two parts one of which slides into the other.

In the above discussion I have shown means of obtaining inductance, capacity and resistance in a concentric conductor system. I have also shown how these elements can be combined to give translation circuits of the pi network type. Numerous other circuits, obtainable by various arrangements of the elements of this invention, will be apparent to those skilled in the art. A great many of the various filter combinations known to the transmission art can be obtained by proper combinations of the above circuits. These circuit elements may also be used in oscillator and amplifier circuits.

What is claimed is:

1. In a concentric conductor system in which an inner conductor is surrounded by a cylindrical conductor concentric therewith and acting as a return therefor, an electrical arrangement associated therewith and having the properties of a pi network including series inductance in one side of the line and impedances bridged across the line on each side of said inductance, said arrangement including a closed vessel enclosing said concentric conductor system, the outer conductor of said concentric conductor system being divided into two parts entering the enclosing vessel at different points, the inner concentric conductor being electrically continuous through the vessel, the inner conductive surface of said vessel forming a conductive part of the path for the transfer of wave energy from one part of said outer concentric conductor to the other and thereby creating an inductance in series with said outer conductor, and lumped impedances electrically connected in effect between said inner conductor and said outer conductor on each side of said inductance.

2. In a concentric conductor system in which an inner conductor is surrounded by a cylindrical conductor concentric therewith and acting as a return therefor, an electrical arrangement associated therewith and having the properties of a pi network including series inductance in one side of the line and impedances bridged across the line on each side of said inductance, said arrangement including a closed vessel enclosing said concentric conductor system, the outer conductor of said concentric conductor system being divided into two parts entering the enclosing vessel at different points, the inner concentric conductor being electrically continuous through the vessel, the inner conductive surface of said vessel forming a conductive part of the path for the transfer of wave energy from one part of said outer concentric conductor to the other and thereby creating an inductance in series with said outer conductor, and resistances surrounding said inner conductor and in contact therewith, said resistances being electrically connected to the two parts of said outer conductor.

3. In a concentric conductor system in which an inner conductor is surrounded by a cylindrical conductor concentric therewith and acting as a return therefor, an electrical arrangement associated therewith and having the properties of a pi network including series inductance in one side of the line and impedances bridged across the line on each side of said inductance, said arrangement including a closed vessel enclosing said concentric conductor system, the outer conductor of said concentric conductor system being divided into two parts entering the enclosing vessel at different points, the inner concentric conductor being electrically continuous through the vessel, the inner conductive surface of said vessel forming a conductive part of the path for the transfer of wave energy from one part of said outer concentric conductor to the other and thereby creating an inductance in series with said outer conductor, and flanges on the two parts of said outer conductor, said flanges being parallel to and each forming with a flange on the inner conductor two capacities connected in effect between said inner conductor and said outer conductor on each side of said inductance.

4. In a concentric conductor system in which an inner conductor is surrounded by a cylindrical conductor concentric therewith and acting as a return therefor, an electrical arrangement associated therewith and having the properties of a pi network including series inductance in one side of the line and impedances bridged across the line on each side of said inductance, said arrangement including a closed vessel enclosing said concentric conductor system, the outer conductor of said concentric conductor system being divided into two parts entering the enclosing vessel at different points, the inner concentric conductor being electrically continuous through the vessel, the inner conductive surface of said vessel forming a conductive part of the path for the transfer of wave energy from one part of said outer concentric conductor to the other and thereby creating an inductance in series with said outer conductor, flanges on the two parts of said outer conductor, said flanges being parallel to and each forming with a flange on the inner conductor two capacities connected in effect between said inner conductor and said outer conductor on each side of said inductance, and resistances connected in one of said concentric conductors on either side of the flange thereon.

5. In a concentric conductor system in which an inner conductor is surrounded by a cylindrical conductor concentric therewith and acting as a return therefor, an electrical arrangement associated therewith and having the properties of a pi network including series inductance on one side of the line and impedances bridged across the line on each side of said inductance, said arrangement including a closed vessel enclosing said concentric conductor system, the outer conductor of said concentric conductor system being divided into two parts entering the enclosing vessel at different points, the inner concentric conductor being electrically continuous through the vessel, the inner conductive surface of said vessel forming a conductive part of the path for the transfer of wave energy from one part of said outer concentric conductor to the other and thereby creating an inductance in series with said outer conductor, flanges on the two parts of said outer conductor, said flanges being parallel to and each forming with a flange on the inner conductor two capacities connected in effect between said inner conductor and said outer conductor on each side of said inductance, and resistances connected in the outer concentric conductor between the flanges thereon and said enclosing vessel.

6. In a concentric conductor system in which an inner conductor is surrounded by a cylindrical conductor concentric therewith and acting as a return therefor, an electrical arrangement associated therewith and having the properties of a pi network including series inductance in one side of the line and impedances bridged across the line on each side of said inductance, said arrangements including a closed vessel enclosing said concentric conductor system, the outer conductor of said concentric conductor system being divided into two parts entering the enclosing vessel at different points, the inner concentric conductor being electrically continuous through the vessel, the inner conductive surface of said vessel forming a conductive part of the path for the transfer of wave energy from one part of said outer concentric conductor to the other and thereby creating an inductance in series with said outer conductor, flanges on the two parts of said outer conductor, said flanges being parallel to and each forming with a flange on the inner conductor two capacities connected in effect between said inner conductor and said outer conductor on each side of said inductance, and a resistance in said inner conductor between the flanges thereon.

7. In a concentric conductor system in which an inner conductor is surrounded by a cylindrical conductor concentric therewith and acting as a return therefor, an electrical arrangement associated therewith and having the properties of a pi network including series inductance in one side of the line and impedances bridged across the line on each side of said inductance, said arrangement including a closed vessel enclosing said concentric conductor system, the outer conductor of said concentric conductor system being divided into two parts entering the enclosing vessel at different points, the inner concentric conductor being electrically continuous through the vessel, the inner conductive surface of said vessel forming a conductive part of the path for the transfer of wave energy from one part of said outer concentric conductor to the other and thereby creating an inductance in series with said outer conductor, flanges on the two parts of said outer conductor, said flanges being parallel to and each forming with a flange on the inner conductor two capacities connected in effect between said inner conductor and said outer conductor on each side of said inductance, a resistance in said inner conductor, and resistances in the outer concentric conductor between the flanges thereon and said enclosing vessel.

RALPH KIMBALL POTTER.